(12) United States Patent
Dahlen et al.

(10) Patent No.: US 6,601,117 B1
(45) Date of Patent: Jul. 29, 2003

(54) ARRANGEMENTS FOR INDEPENDENT QUEUING/TRACKING OF TRANSACTION PORTIONS TO REDUCE LATENCY

(75) Inventors: Eric J. Dahlen, Portland, OR (US); Hidetaka Oki, Yamanashi (JP)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 09/649,171

(22) Filed: Aug. 29, 2000

(51) Int. Cl.[7] ............................. G06F 3/00; G06F 13/36

(52) U.S. Cl. ............................. 710/52; 710/58; 710/5; 710/6; 710/310

(58) Field of Search ...................... 710/52, 306, 310, 710/58, 53, 54, 5, 6, 305–311

(56) References Cited

U.S. PATENT DOCUMENTS 6,230,228 B1 * 5/2001 Eskandari et al. ............ 710/52

* cited by examiner

Primary Examiner—Jeffrey Gaffin
Assistant Examiner—Joshua D Schneider
(74) Attorney, Agent, or Firm—Jeffrey B. Huter

(57) ABSTRACT

Arrangements directed to arrangements for queuing/tracking of transaction portions to reduce latency are disclosed. A queue/pointer arrangement to queue first execution information portions and second execution information portions for transactions may comprise a first queue and a second queue. The first queue and the second queue may be adapted to store the first execution information portions and the second execution information portions, respectively, may have a first pointer arrangement and a second pointer arrangement, respectively, and may operate independently of one another. The first execution information portions and corresponding second execution information portions with respect to the first queue and the second queue, respectively may comprise, address portions and full-line portions for the transactions.

15 Claims, 6 Drawing Sheets

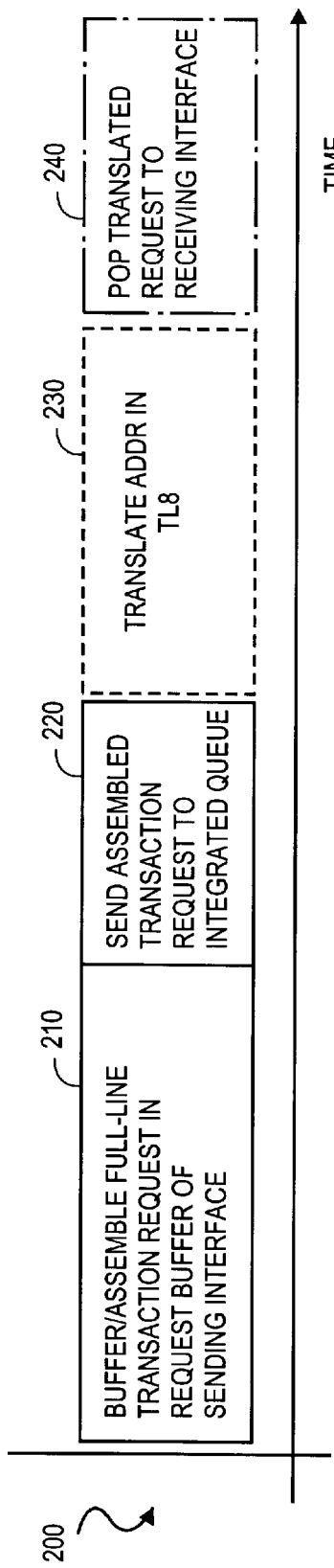
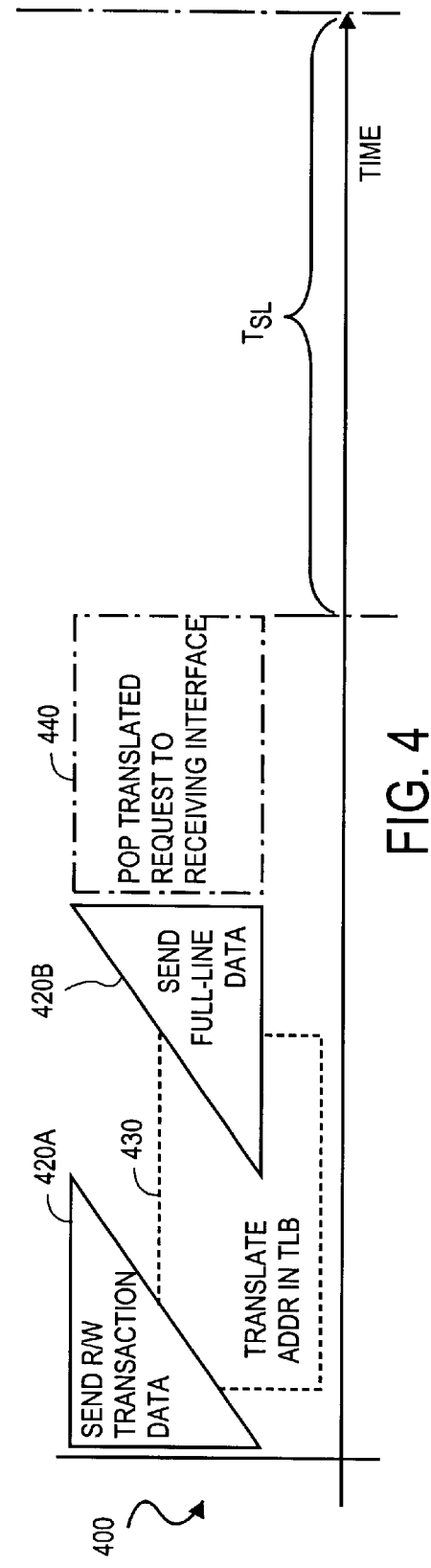
FIG. 2 (PRIOR ART)
FIG. 4

ARRANGEMENTS FOR INDEPENDENT QUEUING/TRACKING OF TRANSACTION PORTIONS TO REDUCE LATENCY

FIELD

The present invention is directed to arrangements for queuing/tracking of transaction portions to reduce latency.

BACKGROUND

Often times within computing systems, and especially within bridging devices, transactions such as read or write requests are passed between differing devices (e.g., interfaces) using queue arrangements. One arrangement is to let each device (e.g., interface) handle/process each respective transaction independently from all other devices, and to pass a transaction to a next sequential device once the device's handling/processing of the transaction is complete. However, during research leading to the present application, it was found that such independent/sequential passage and handling/processing of transactions by sequential devices are disadvantageous in that a latency to move a transaction through the system is not minimized. Accordingly, what is needed is a new and improved approach for the handling of transactions passed from device-to-device within a system.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 2 shown an example time chart of operations relating to the FIG. 1 example arrangement;

FIG. 4 shown an example time chart of operations relating to the FIG. 3 example arrangement;

DETAILED DESCRIPTION

Figure 1:
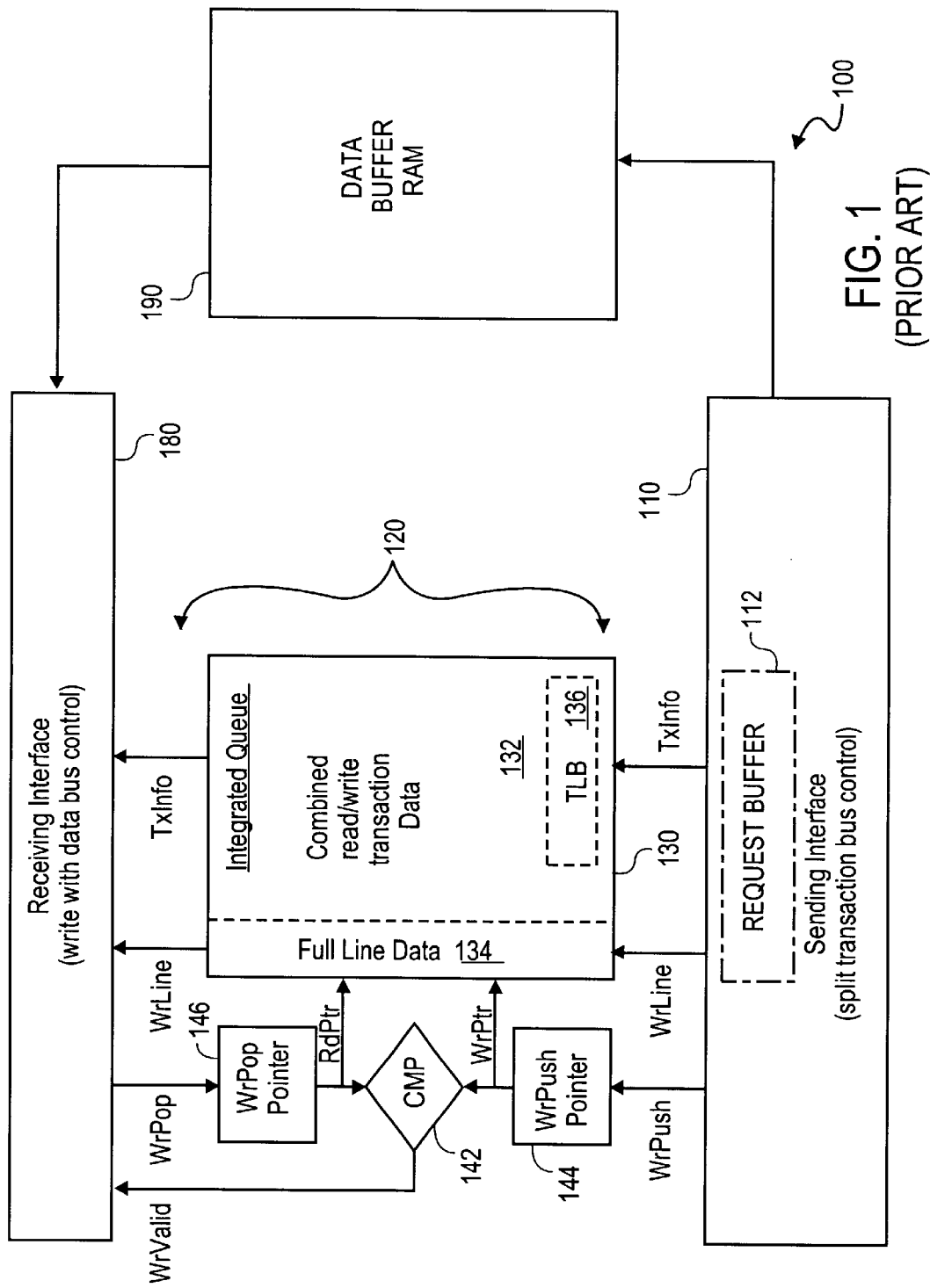
FIG. 1 illustrates an example background interface queue arrangement useful in gaining a more thorough understanding/appreciation of the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. Still further, timing diagram FIGS. are not drawn to scale, and instead, exemplary and critical time values are mentioned when appropriate. Well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that differing combinations of hard-wired circuitry and software instructions can be used to implement embodiments of the present invention, i.e., the present invention is not limited to any specific combination of hardware and software. Turning now to more detailed description, FIG. 1 illustrates an example disadvantageous interface queue arrangement useful in gaining a more thorough understanding of the invention. The disadvantageous FIG. 1 example (as well as an advantageous FIG. 3 example) may be practiced in a split transaction bus control environment, although practice of the present invention is not limited thereto. More particularly, the arrangement 100 includes a sending interface 110 which, for the purposes of this disclosure, sends or forwards transactions toward a receiving interface 180. The sending interface 110 further includes a request buffer 112. Provided between the sending interface 110 and receiving interface 180, are data buffer 190 and queue/pointer 120 arrangements which assist in forwarding of transactions from the sending interface 110 to the receiving interface 180.

More particularly, illustrated within FIG. 1 is a data buffer RAM 190 which is used to store data (such as pixel data) with respect to transactions. Further shown is a queue/pointer arrangement 120 having an integrated queue 130 which includes therein a combined read/write (r/w) transaction data portion 132, as well as a full line data portion 134. More particularly, the integrated queue may be implemented as a register file with rotating read and write pointers rather than a true first-in-first-out (FIFO) structure. The combined r/w transaction data portion 132 operates in conjunction with a translation look-aside buffer (TLB) 136 (shown in a representative dashed-line form), for performing address translation for relating an address of a transaction to an address within main memory. The queue 130 operates with some type of arrangement which maintains a proper ordering of any queued transactions therein, so as to guarantee proper ordering/handling of the transactions within the system. Further, ones of r/w transaction data and FL data are stored/maintained in the queue 130 in proper related correspondence with each other to maintain an integrity of data with respect to each transaction, e.g., by storing the r/w transaction data and FL data into differing bits of a same register entry (e.g., addressable memory location, byte).

The queue/pointer arrangement 120 further includes a comparator 142, a transaction TrPushPointer 144, a transaction TrPopPointer 146, a write pointer WrPtr, a read pointer RdPtr, with comparator 142 generating a transaction TrValid signal (in an example manner described ahead).

Figure 5:
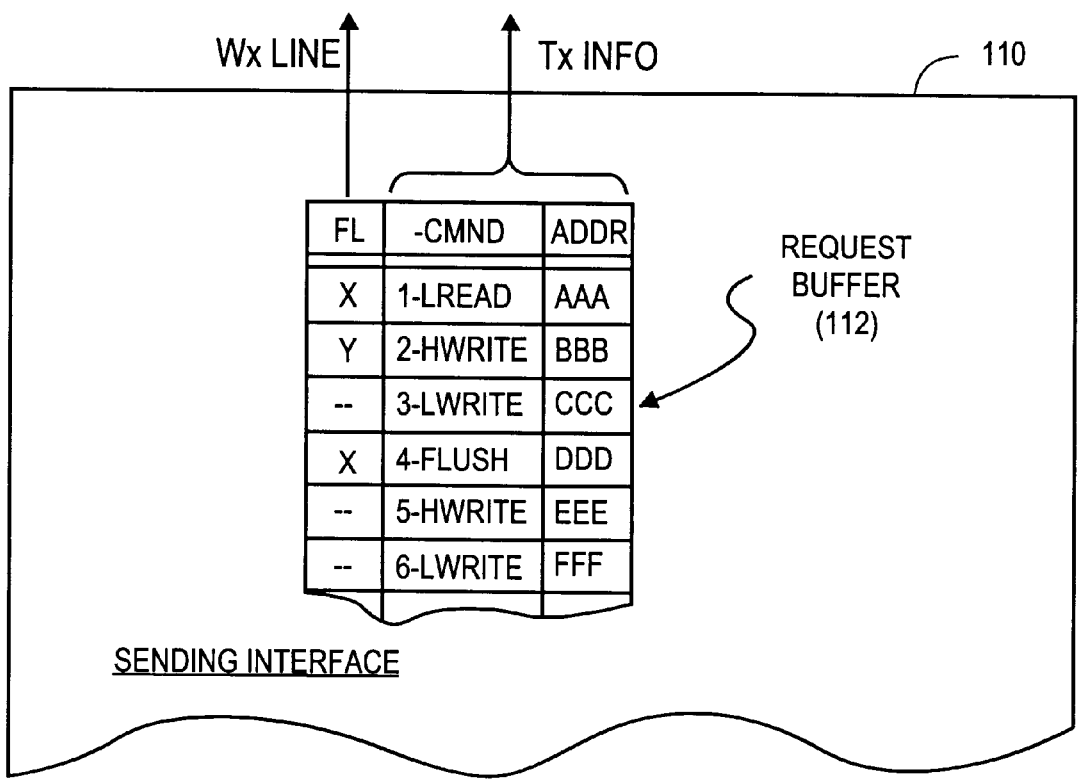
FIG. 5 illustrates example contents of a request buffer of a sending interface shown in FIG. 1.

Turning now to further description, FIG. 5 illustrates example contents of the request buffer 112 (of the sending interface 110) in greater detail. More particularly, the request buffer 112 may include sufficient memory to store information with respect to a plurality of transaction requests, e.g., sufficient buffer resources may be provided to accommodate a maximum expected number of transactions which may be waiting/assembling at any given time within the sending interface 110.

A first example information of interest in discussion of the FIG. 1 disadvantageous arrangement (as well as the FIG. 3 advantageous arrangement) is full line (FL) indication data. More particularly, it is known in the art that it is more efficient to perform a memory access (e.g., of a main memory or a subsidiary buffer memory such as 190) by using a full line (e.g., page) of memory rather than a plurality of partial line requests. Accordingly, the request buffer 112 includes an FL indication in correspondence with each of the transactions as an indication as to whether information sufficient to perform a full line memory access is available. More specifically, within the FL column of FIG. 5, an "X" designation indicates a "don't care" situation, (i.e., an "X" or "don't care" designation may be irrelevant for certain types of transactions, e.g., read transactions), a "Y" designation indicates a full line is ready for the corresponding transaction operation, and finally, a dashed "--" designation indicates that a full line is not yet ready for the corresponding transaction operation.

Further shown in the FIG. 5 request buffer 112 is a command column CMND including example transaction commands which, for example purposes, are labeled 1-LREAD, 2-HWRITE, 3-LWRITE, 4-FLUSH, 5-HWRITE and 6-LWRITE, as well as an address ADDR column containing the corresponding addresses AAA, BBB, CCC, DDD, EEE, and FFF, respectively.

In the disadvantageous FIG. 1/FIG. 5 arrangement, the sending interface 110 is arranged to buffer and assemble transactions independent of the queue/pointer arrangement 120 and receiving interface 180, and to forward any transactions from the sending interface 110 only upon complete assembly of the transaction. More particularly, the sending interface maintains the buffered queue of transactions in order to maintain an ordering of, and facilitate an assembly of, such transactions, and forwards any next transaction toward the receiving interface only when all information with respect to the transaction is completely assembled.

In the FIG. 5 example, since the first transaction pertaining to the 1-LREAD command having a "X" (don't care) FL designation and an address AAA, and likewise the second transaction pertaining to the 2-HWRITE command with the "Y" (fully assembled) FL designation and address BBB, are both completely assembled, both such commands would be forwarded from the sending interface 110. In the FIG. 1/FIG. 5 example given, the FL information is output along a WrLine forwarding path, whereas the CMND and ADDR information would be forwarded along a TxInfo forwarding path. In contrast, a third transaction relating to the 3-LWRITE command having the "--" (not fully assembled) FL information and the address CCC, would not yet be forwarded and would remain buffered within the request buffer 112 of the sending interface 110, until all information with respect to such transaction is fully assembled. Likewise, transactions subsequent to the not yet fully assembled transaction would also not yet be forwarded so as to maintain a proper ordering of the transactions. The time chart 200 of FIG. 2 shows the buffering/assembly and sending operations of the sending interface 110 as representative solid-lined blocks 210 and 220, respectively.

Once the FL information as well as the CMND and ADDR information is forwarded to the integrated queue 130, stored, and such information is treated in an integrated fashion within the integrated queue 130, e.g., the FL, CMND and ADDR information are all stored within a same register and are pointed to by a same pointer (WrPtr and/or RdPtr). Once stored within the integrated queue 130, the TLB 136 arrangement is used to translate the address portion ADDR of the transaction so as to relate an address of the transaction to an address of the main memory. Numerous TLB arrangements are known in the art and are not the main focus of discussion of the present invention. Accordingly, the TLB arrangement operation is only shown in representative form as dashed-block 136 in FIG. 1 and dashed-block 230 within the FIG. 2 time chart 200.

With forwarding of a transaction from the sending interface, the sending interface also performs a TrPush transaction to increment the TrPushPointer 144. Logic (not shown) may be adapted to be responsive to the increment and completion of the TLB operation of the transaction, for example, to cause the WrPtr to change to point to, for example, the latest transaction within the integrated queue 130 which has had appropriate processing (e.g., translation) completed.

Periodically or at predetermined times, the comparator 142 compares whether the RdPtr pointer is pointing to a same register as the WrPtr pointer, and if not (e.g., if the WrPtr pointer is "ahead" of the RdPtr pointer within the register files of the integrated queue), such is an indication that there is an outstanding transaction waiting within the integrated queue to be performed and a predetermined TrValid signal is used to indicate such outstanding/ready status to the receiving interface 180. Responsive to an indication of TrValid that there is an outstanding/ready transaction waiting within the integrated queue 130, the receiving interface 180 performs a POP operation (shown representatively by long-/short-dashed block 240 in FIG. 2) so as to POP a next sequential transaction (via the WrLine and TxInfo paths) from the integrated queue 130, and uses a TrPop (FIG. 1) signal to increment the TrPopPointer 146 and thus the RdPtr pointer. The receiving interface then performs appropriate internal processing with respect to the POPPED transaction. Such internal processing is not a focus of this disclosure, and accordingly, detailed discussion thereof is omitted for sake of brevity.

A problem with the FIG. 1 disadvantageous arrangement is that transactions are treated independently and sequentially by the differing FIG. 1 devices (e.g., interfaces) or components (e.g., queue/pointer arrangement). More particularly, the sending interface 110 buffers/holds any respective transaction (and subsequent ordered transactions) until such a time that the transaction information is substantially completed, and only then does it forward the completed transaction to the next device or component integrated queue 130. This partially defeats the purpose of the split transaction bus, as well as increases the size and complexity of the sending interface to support the required storage.

That is, the buffering/assembly is disadvantageous in a number of regards. First, as indicated representatively by the FIG. 2 elongated block 210, such buffering/assembly represents a significant period of time which adds to a latency of a transaction moving through the FIG. 1 disadvantageous arrangement. That is, the CMND and ADDR information of a unassembled transaction within the request buffer 112 may be completed/available well before the FL information completes, and since the buffered/delayed CMND and ADDR information is not yet forwarded to the integrated queue 130, the TLB cannot begin its translation operation.

As a result, the TLB processing time is not "hidden" and adds to a latency of the transaction moving through the system. Second, the necessity for sufficient request buffer resources within the sending interface 110 so as to store an expected number of unassembled transactions at any given time represents an increase in design and operational complexity and cost to the sending interface 110.

Accordingly, with the FIG. 1 disadvantageous arrangement, the translation operation is not initiated until a point in time sequential to the sending of the assembled transaction request to the integrated queue 130. Stated differently, the operations of the sending interface 10 and the integrated queue 130 are performed sequentially in time, which represents an inefficient processing arrangement and adds again to a latency of the FIG. 1 disadvantageous arrangement. Further, the logic at the destination end of the queue gets no advance notice of incoming transactions at and beyond a write until the associated data have been received and that write is ready to be forwarded. This precludes hiding arbitration latency at the receiving end behind data latency at the requesting end, effectively making the pipeline across the queue completely serial in nature.

Figure 3:
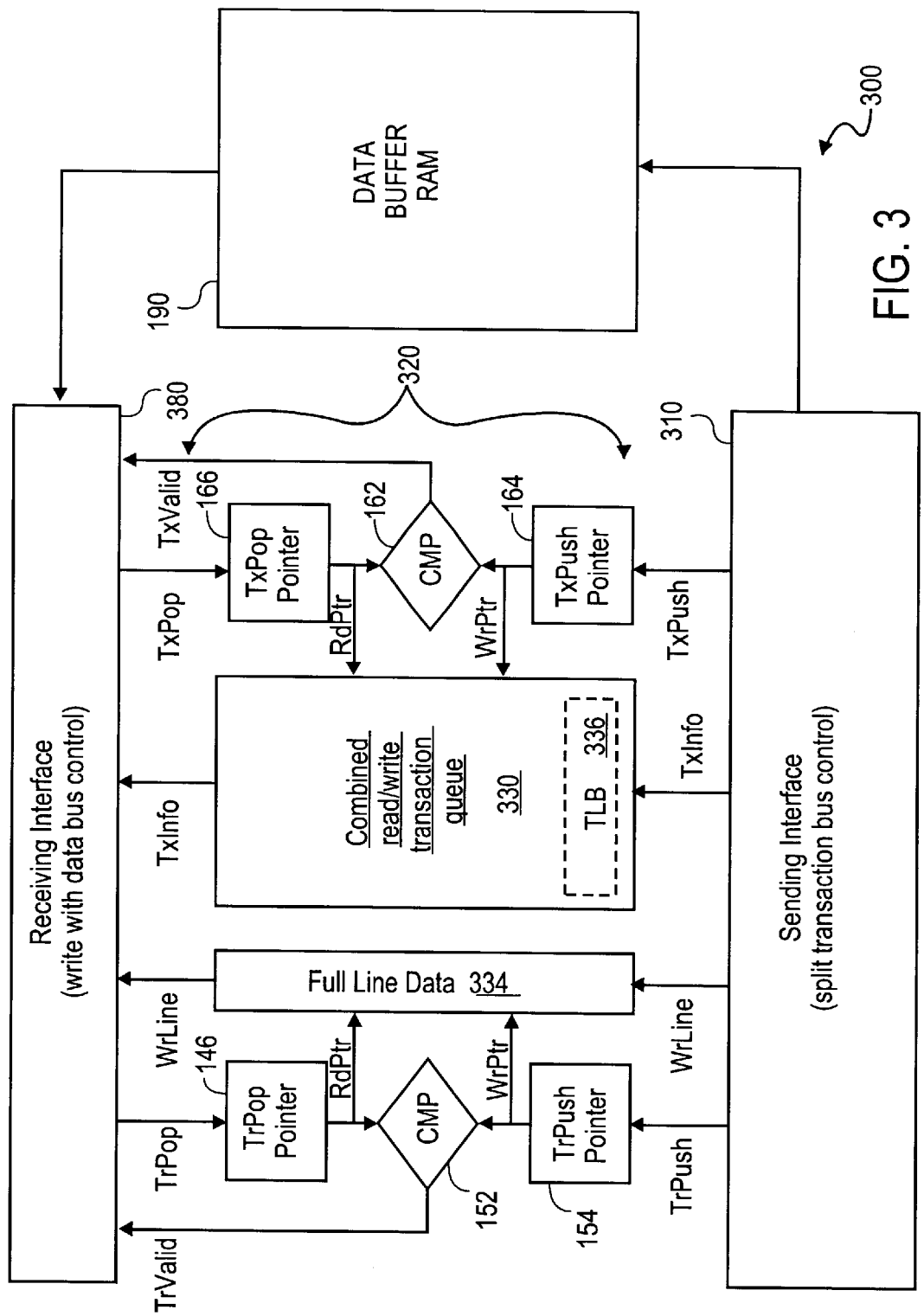
FIG. 3 illustrates an example advantageous interface queue embodiment in accordance with the present invention.

Discussion turns next to the advantageous example arrangement of FIG. 3. Any components of FIG. 3 operating in a manner similarly/analogous to FIG. 1 components is labeled by a same reference numeral and redundant discussion thereof is avoided for sake of brevity. Before detailed discussion of FIG. 3, mention of the following is in order.

More particularly, the CMND/ADDR and FL information are execution information in that such information will be used to direct execution of the transaction, e.g., addressing, command-type or other types of administrative/management information for directing execution of the transaction, rather than data (e.g., display pixel data) which is the subject of the transaction note that data is directed through the Data Buffer RAM 190). That is, a transaction may contain both execution information useable to control execution of the transaction (i.e., execution information) and transaction data (e.g., data to be stored within a memory). Accordingly, the CMND/ADDR information may be considered first execution information portions (e.g., execution-direction bits of a transaction), and the FL information may be considered second execution information portions (e.g., other execution-directing bits of a transaction) . While the example embodiment of the present invention is, for the sake of brevity, described with only two execution information portions, it should be understood that a transaction may have additional execution information portions or that the CMND/ADDR and FL information may be able to be subdivided into more than two portions. Further, in situations where there are more than two execution information portions, practice of the present invention is not limited to just two queue/pointer arrangements, i.e., practice may be made with an increased plurality of queue/pointer arrangements, albeit at increased cost/complexity and timing/signal management of the arrangement.

Turning now to greater detail of the arrangement 300, the FIG. 3 sending interface 310 operates somewhat differently from the FIG. 1 sending interface 110. More particularly, rather than buffering/assembling complete transactions, the sending interface 310 forwards sub-transaction information as it becomes completed, to the FIG. 3 queue/pointer arrangement 320. More particularly, as mentioned previously, the CMND and ADDR information of a transaction request may be fully assembled well in advance of the FL information. The FIG. 3 sending interface is adapted to take advantage of such fact by immediately forwarding the CMND and ADDR information to the queue/pointer arrangement 320, as illustrated representatively by the FIG. 4 solid-lined triangular block 420A within the time chart 400. As a result thereof, the FIG. 3 combined read/write transaction queue 330 and the TLB 336 arrangement/ operation associated therewith can immediately begin to perform the TLB operation (as shown representatively by the short-dashed block 430 in FIG. 4). Thus, the TLB operation may be performed in parallel, while the sending interface continues to determine the FL data with respect to the transaction. Accordingly, a time overhead of the TLB operation can be hidden by being performed in parallel with continued FL data determination, so as to further minimize a latency of transaction travel through the FIG. 3 example arrangement.

More particularly, as the TLB operation will take a known predetermined or average time for completion, the FL data completion operation can be performed in parallel with the TLB translation operation. Once the FL data is completed, the sending interface can forward such information to the full line queue 334 of the queue/pointer arrangement 320, as again shown representatively by the solid-lined triangular block 420B in FIG. 4. Thus, in essence, the CMND and ADDR information is sent ahead, and subsequently, the FL data which is sent later, catches up to the corresponding CMND and ADDR information within the queue/pointer arrangement 320. The CMND/ADDR and FL queues are "independent" in the sense that such queues can be loaded and/or unloaded with CMND/ADDR and FL information portions at completely differing times and with completely differing device-to-queue or queue-to-device transmissions, i.e., loading/operations/unloading of the queues are substantially, if not totally, independent from one another.

One advantage of the above-described operations of the example FIG. 3 arrangement is that the buffering resources within the sending interface 310 is substantially reduced and/or possibly even totally eliminated in comparison with the FIG. 1 sending interface 110. More particularly, since the CMND and ADDR information is immediately forwarded to the queue/pointer arrangement 320, and since such CMND and ADDR information represents a good portion of any transaction, the amount of buffering resources to store the transaction is lessened or eliminated. That is, since the FL information will likewise be immediately forwarded upon FL data completion, there may not be any need to even store the FL data within the sending interface 310. Further, even if it is necessary to store the FL data (e.g., for subsequent transactions, to wait for bus access) within the sending interface 310, since such FL information is small in size, only a small amount of buffering capacity is needed within the sending interface 310.

In addition to the above-discussed advantage, the fact that the differing CMND/ADDR and FL information portions are capable of being independently transmitted at differing times and/or within differing transmissions from device-to-queue or queue-to-device, may lessen transmission path overhead required between the queues/devices. For example, since the CMND/ADDR and FL information portions are not required to be transmitted in parallel, perhaps a fewer number of transmission paths could be provided between the queues/ devices and be used in common to transmit the CNMD/ ADDR and FL information portions during differing times.

As mentioned previously, the FL data is sent later to catch up to the corresponding CMND and ADDR information within the queue/pointer arrangement 320. The advantageous reduction in latency and the reduction of sending interface buffer requirements is at a cost of increased complexity of the queue/pointer arrangement 320. More particularly, it should become apparent from the foregoing discussion that some type of arrangement must be made to allow the CMND and ADDR information to be sent ahead and the FL data to be sent later, and to have the FL data corresponded or indexed to the appropriate CMND and ADDR information of a same transaction. The FIG. 3 example arrangement accomplishes the same through use of independent queues and independent pointer arrangements for the independent queues.

More specifically, the FIG. 3 example arrangement is divided into two separate queue/pointer arrangements, i.e., a combined r/w transaction queue 330 with corresponding pointer arrangement, as well as a full line queue 334 with its corresponding pointer arrangement. While the FIG. 3 example arrangement is shown as essentially being divided into two independent queues and their corresponding pointer arrangements, practice of the present invention is not limited thereto, i.e., practice of the present invention can also be made with division into additional queues and/or pointers. For example, the combined r/w transaction queue arrangement 330 might be further divided into a independent CMND queue and independent ADDR queue, with each again having an independent pointer arrangement. In addition, it should be understood that the independent queues may be provided in separate discrete memories, as differing parts of a same memory, or any combination thereof.

The combined r/w transaction queue 330 (similarly to the integrated queue 130) operates in conjunction with a TLB 336 (which can be provided in any combination of hardware and/or software), for performing address translation for relating an address of a transaction to an address within the main memory. Again, the queue 330 operates with some type of arrangement which maintains proper ordering of any queued transactions therein.

The combined r/w transaction queue arrangement 330 has associated therewith a pointer arrangement which includes a comparator 162, a transaction TxPushPointer 164, a transaction TxPopPointer 166, a write pointer WrPtr, a read pointer RdPtr, with the comparator 162 generating a transaction queue TxValid signal (in an example manner described ahead). That is, again the combined r/w transaction queue arrangement 330 (like the integrated queue 130) may be implemented as a registered file with rotating read and write pointers rather than a true FIFO structure. Further, the pointer arrangements may be provided by any combination of hardware and software.

With forwarding of the CMND and ADDR information from the sending interface 310, the sending interface also performs a transaction queue TxPush to increment the TxPushPointer 164. Logic (not shown) may be adapted to be responsive to the increment and completion of the TLB operation with respect to the transaction, to cause the WrPtr pointer to point to, for example, the latest transaction within the combined r/w queue arrangement 330 which has had appropriate processing (e.g., translation) completed.

Periodically or at predetermined times, the comparator 162 compares whether the RdPtr pointer is pointing to a same queue 330 register as the WrPtr pointer, and if not, (e.g., if the WrPtr pointer is "ahead" of the RdPtr pointer within register files of the queue arrangement 330), such is an indication that there is outstanding/ready CMND and ADDR data waiting within the queue and a predetermined TxValid signal is used to indicate such outstanding/ready status to the receiving interface 380. Responsive to an indication of TxValid that there is outstanding/ready CMND and ADDR waiting within the queue 330 (as well as having an appropriate WrValid signal as described ahead), the receiving interface performs a POP operation (shown representatively by long-/short-dashed block 440 in FIG. 4) so as to POP the next sequential CMND and ADDR information (and FL information) from the queue 330, and uses a TxPop (FIG. 3) signal to increment the TxPopPointer 166 as well as the RdPtr pointer. Again, the receiving interface 380 performs appropriate processing with respect to obtained information. Such internal processing is not a focus of this disclosures, and accordingly, detailed discussion thereof is omitted for sake of brevity.

Similar discussions can be made with respect to the FL queue 334's pointer arrangement which includes the comparator 152, WrPushPointer 154, WrPopPointer 156, write pointer WrPtr, read pointer RdPtr, with the comparator 152 instead generating a WrValid signal indicative of whether there is outstanding FL data waiting within the queue 334. Again, responsive to the WrValid signal that there is outstanding/ready FL data waiting, the receiving interface 380 performs a POP operation when appropriate to obtain the next sequential FL data as well as to output a WrPop signal to increment the WrPopPointer 156.

With respect to maintaining a correspondence between the CMND/ADDR information and the FL information, as long as CMND/ADDR information and FL information is pushed into the queues 330 and 334, respectively, in one-to-one correspondence, as long as an ordering of such information within the independent queues is maintained, then such correspondence between the CMND/ADDR and FL information should be maintained and appropriately related CMND/ADDR and FL information should be able to be POPPED from the queues 330 and 334 in correct correspondence. Practice of the present invention is not limited to such arrangement, as many differing approaches could be used to maintain correspondence between the CMND/ADDR and FL information within the queues, e.g., an indexing table.

More particularly, the term "pointer" is used/meant in a generic sense within the present disclosure, in that there are numerous possible ways to accomplish a pointer arrangement. While the above example embodiment used a pointer arrangement to independently keep track of un-popped ones of the CMND/ADDR and FL information portions within the independent queues, an alternative pointer arrangement could be used for keeping correct correspondence between appropriate ones of the CMND/ADDR and FL information portions. For example, matching sequence numbers could be assigned/stored with respect to both the CMND/ADDR and FL information portions for any given transaction, i.e., within the independent queues. A "ready" bit be used/stored with respect to each one of the CMND/ADDR information portions to flag which portions have had TLB processing completed. The matching sequence numbers could then be used to effect simultaneous unloading of corresponding ones of the CMND/ADDR and FL information portions from the queue, or to later match up corresponding ones of the CMND/ADDR and FL information portions (e.g., within the receiving interface). Further, it should be understood that practice of the present invention is not limited to the queues having matching or similar pointer arrangements, i.e., practice may also be made by the queues having completely differing pointer arrangements from one another.

Turning discussion next to the receiving interface 380, such receiving interface 380 operates somewhat differently from the FIG. 1 receiving interface 180. More particularly, since the FIG. 1 CMND/ADDR/FL information is maintained within an integrated queue 130 having only a single pointer arrangement associated therewith, the FIG. 1 receiving interface 180 is responsive only to the singular TrValid signal in determination of whether it is appropriate to POP CMND/ADDR/FL information from the queue 130 and to increment a TrPopPointer. In contrast, the FIG. 3 example arrangement having independently operating queues 330, each having its own independent pointer arrangement, must look at a number of valid signals to determine whether CMND/ADDR and FL information are appropriate to be POPed from the queues 330 and 334 and a plurality of POP pointers are incremented upon a POPing action. More specifically, the receiving interface 380 monitors both the TxValid and WrValid signals for appropriate indication that both CMND/ADDR and FL information are ready/waiting within the queues 330 and 334, respectively. Only upon both valids does the receiving interface 380 POP such information, and then increment both the TxPopPointer 166 and the WrPopPointer 156.

Accordingly, although practice of the present invention may be made by POPPING the CMND/ADDR and FL information for any given transaction simultaneously, practice might be alternatively made by POPPING such information at different times. The approach of POPPING the information at different times might be advantageous in allowing the receiving interface to immediately start processing of sub-portions of a transactions, rather than writing to POP complete transaction information. If POPPING of CMND/ADDR and FL information are conducted at differing times by the receiving interface 380, then the interface 380 has the responsibility (e.g., via indexing) of maintaining correspondence between such information.

A time-savings benefit of the FIG. 3 advantageous arrangement over the FIG. 1 arrangement can be seen by a comparison of the time charts 400 and 200 of FIGS. 4 and 2, respectively. More particularly, referencing FIG. 4, since the FIG. 3 advantageous arrangement no longer requires completion of the FIG. 2 buffer/assemble operation 210 before sending, and further, since the translation operation 430 can be conducted by the TLB 336 substantially or majorly overlappingly (i.e., in parallel) with the sending operations 420A/420B of the sending interface 310, a substantial saved latency time $T_{SL}$ is advantageously realized over the FIG. 2 sequential operations. The cumulative latency time saved over a plurality (e.g., thousands or millions) of transactions is substantial, leading to a transaction forwarding arrangement which is very advantageous in terms of time savings at the cost of inconsequential further complexity of the queue/pointer arrangement and receiving interface. Such substantial time savings is very favorable in this trend toward ever increasing computing speeds, and renders the transaction arrangement of the present invention very competitive within the marketplace.

Figure 6:
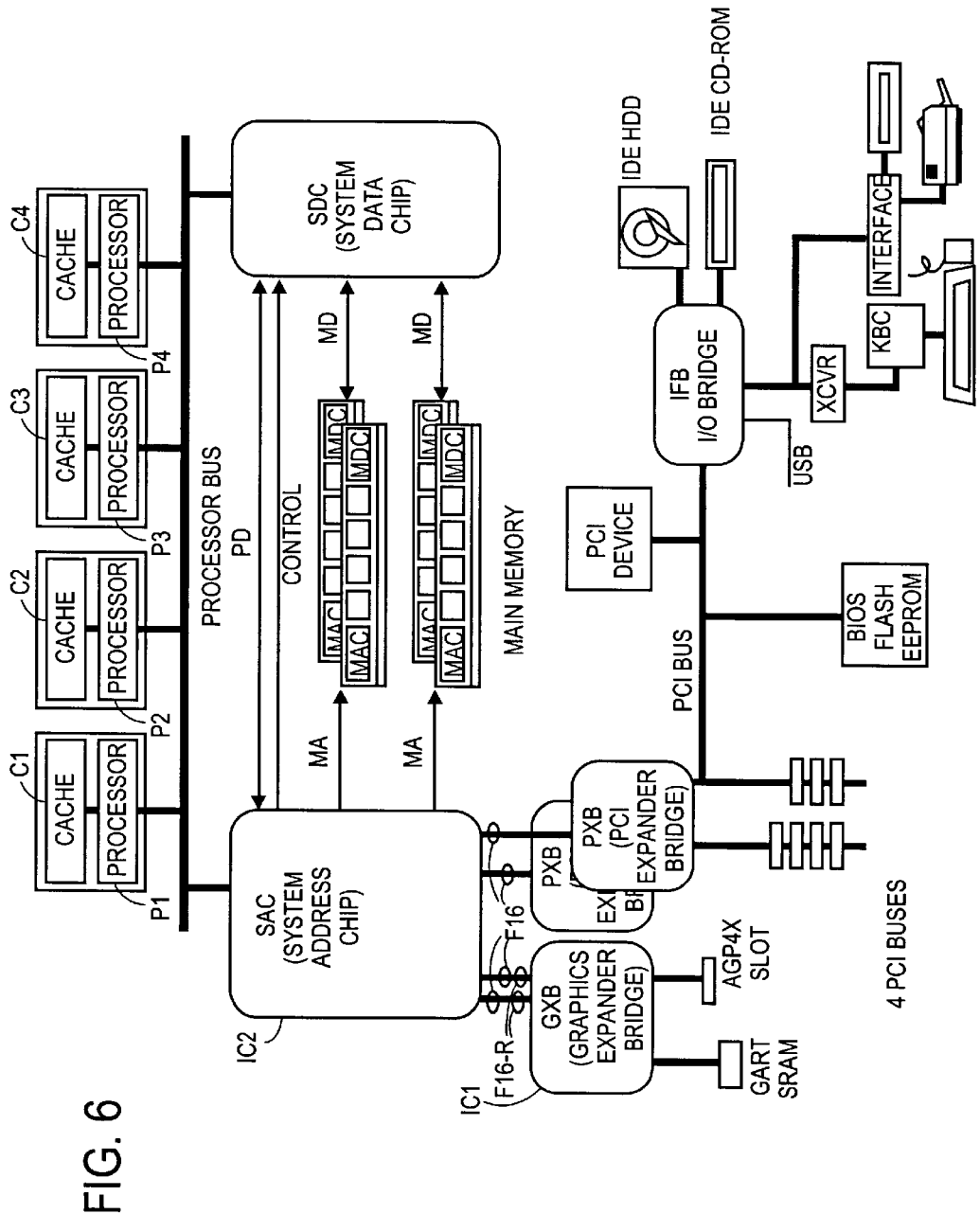
FIG. 6 is a block diagram of an example system into which embodiments of the present invention can be practiced.
Figure 7:
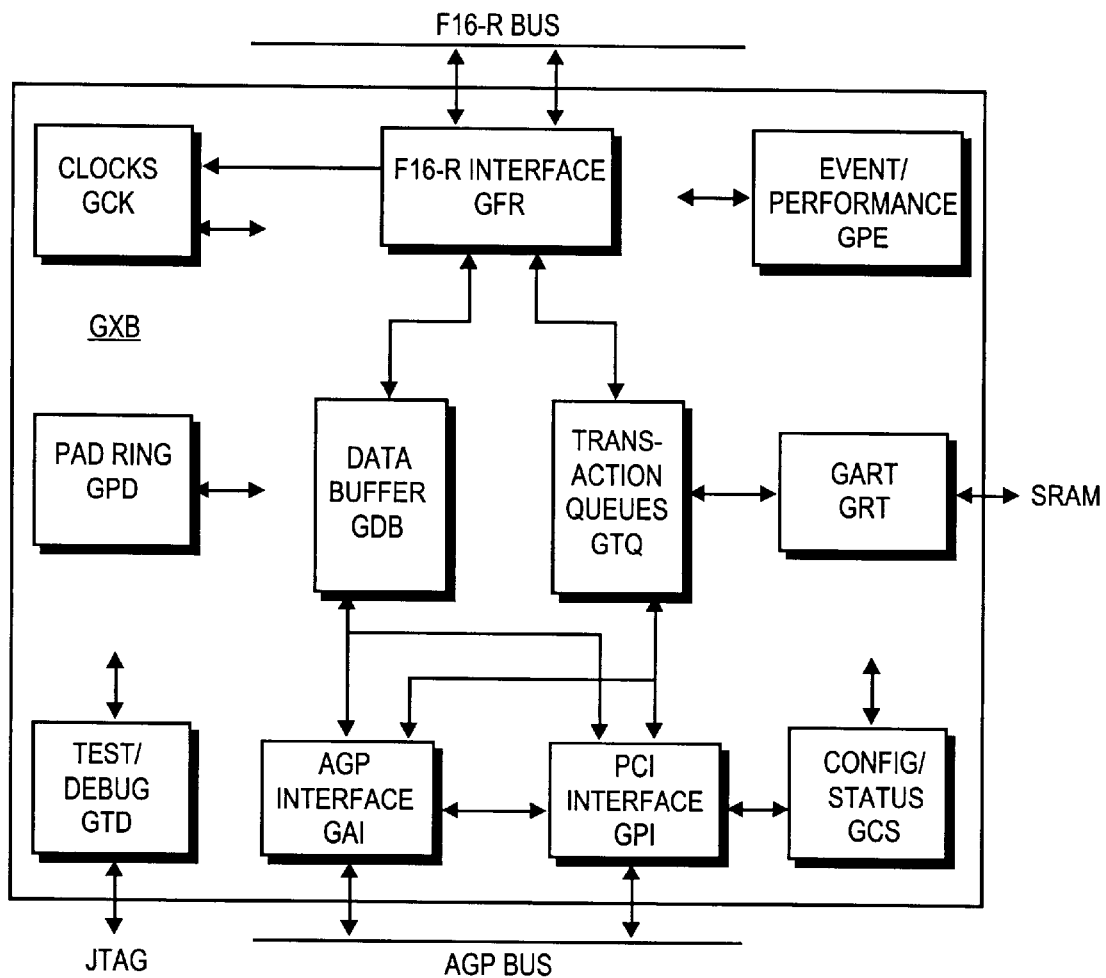
FIG. 7 is a block diagram showing example further details with respect to a GXB block of FIG. 6.

An example implementation of the present invention will be briefly described using the FIGS. 6, 7 example computing system, although practice of the invention is not limited thereto, i.e., the invention may be able to be practiced with other types or arrangements of computing systems. Turning now to FIG. 6, such FIG. 6 illustrates a collection of chips (e.g., including a chipset) and components which implement a mid-to-high end server platform. Shown are a plurality of a processors, a plurality of caches, a System Address Chip SAC and a System Data Chip SDC all arranged with respect to a front side bus FSB or processor BUS, and further shown is a Main Memory subsystem arranged between, and accessed by, the SAC/SDC pair of integrated circuit (IC) chips.

The System Address Component SAC is one central component of a chipset, and connects to the address and control sections of the front side bus FSB, and is responsible for translating and directing FSB accesses to an appropriate F16 bus or memory. It also acts as a routing agent for inbound traffic, directing traffic to a peer F16 bus, memory or the FSB. The System Data Component SDC connects not only to the data signals on the FSB, but also to the memory subsystem and the SAC (e.g., via private bus PD and Control lines). The data for all transfers passes through the SDC, whether from the FSB to memory, from F16 to memory or peer to peer F16. The connection between the SAC and SDC allows for concurrent data transfers to the FSB and to the F16 buses. This maximizes the available bandwidth to each system agent.

Within the Main Memory subsystem, a Memory Address Component MAC on memory cards receives signals on memory address MA lines, and translates memory cycles issued by the SAC into a protocol required by memory chips (e.g., dynamic random access memories DRAM'S). There can be multiple MAC's per memory card. The Memory Data Component MDC on the memory cards acts as a routing agent between the SDC and data pins of the memory array, i.e., with respect to data signals provided on memory data MD lines. The MDC multiplexes data going into the SDC to select a proper data path for data coming from the memory array, and provides a distribution network for data being delivered to the memory. There may be multiple MDCs per memory card.

Turning now to additional example components attached to the SAC via ones of a plurality of busses F16, a Peripheral Computer Interconnect PCI eXpansion Bridge (PXB) may provide a bus protocol bridging function between the F16 bus and a PCI bus. A single PXB may connect to one F16 bus and may create multiple busses, e.g., two 33 Mhz, 32 bit PCI buses. A strapping option may allow for the PXB to optionally support a single 64 bit PCI bus, and there may multiple PXBs within the system, e.g., from 1 to 4 PXBs. Additional components (not of interest to the understanding of the present disclosure) may be arranged in association with the PCI bus, e.g., a BIOS FLASH EPROM, PCI Device, an interface bridge IFB acting as an input/output I/O bridge, Integrated Device Electronics hard-disk-drive IDE HDD, IDE CD-ROM, universal serial bus USB, etc.

In moving to yet an additional branch connected to the SAC, a Graphics eXpansion Bridge GXB provides a bus protocol bridging function between another F16 bus arrangement and an Accelerated Graphics Port AGP. The addition of the GXB to the FIG. 6 system allows such system to address a mid-to-high end workstation market segment by adding a high performance, dedicated graphics port.

Although the present invention is not limited thereto, the GXB will be used to describe further details with respect to the example embodiment of the present invention. As shown in FIG. 7, the GXB may be partitioned into various units for implementation purposes, for example, the GXB component may consist of the following graphics G units: Graphics AGP Interface (GAI) Unit; Graphics PCI Interface (GPI) Unit; Graphics Transaction Queue (GTQ) Unit; Graphics Data Buffer (GDB) Unit; Graphics Re-Mapping Table (GRT), also known as Graphics Address Re-mapping Table (GART); Graphics F16 Ring (GFR) Interface Unit; Graphics Configuration and Status (GCS) Unit; Graphics Performance Monitor/Event (GPE) Logic Unit; Graphics Test and Debug (GTD) Unit; Graphics Clock and Reset (GCK) Unit; and Graphics Pad Ring (GPD) Unit. As but one example, the FIG. 3 example arrangement may be implemented within the FIG. 6, 7 system by having the AGP Interface GAI arrangement adapted to function as the FIG. 3 Sending Interface 310 having the Transaction Queues GTQ arrangement adapted to function as the FIG. 3 queue/pointer arrangement 320, and finally having the F16-R Interface GFR arrangement adapted to function as the FIG. 3 Receiving Interface 380. Further, the GART may provide the operations of the TLB. Practice of the present invention is not limited thereto, e.g., embodiments of the present invention could easily be practiced within any other bridging component of FIG. 6, e.g., the PXB bridge, IFB bridge, SAC, etc.

Although example embodiments of the present invention were described using an example system block diagram in an example server environment, practice of the invention is not limited thereto, i.e., the invention may be able to be practiced with other types of systems, and in other types of environments (e.g., personal computer (PC)).

As a conclusionary statement, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A queue/pointer arrangement to queue first execution information portions and second execution information portions for transactions, said arrangement comprising:
    a first queue and a second queue adapted to store said first execution information portions and said second execution information portions, respectively, said first queue and said second queue having a first pointer arrangement and a second pointer arrangement, respectively, wherein said first queue and said second queue operate independently of one another,
    wherein said first execution information portions and corresponding said second execution information portions with respect to said first queue and said second queue, respectively comprise, address portions and full-line portions for said transactions.

2. A queue/pointer arrangement as claimed in claim 1, further comprising:
    a sending interface adapted to transmit said first execution information portions and corresponding said second execution information portions to said first queue and said second queue, respectively, in at least one of differing times and differing transmissions.

3. A queue/pointer arrangement as claimed in claim 2, wherein said sending interface is adapted to transmit said first execution information portions when information thereof is complete, and to transmit corresponding said second execution information portions when information thereof is complete, with each first execution information portion and a corresponding second execution information portion capable of being completed at mutually differing times.

4. A queue/pointer arrangement as claimed in claim 1, wherein said first queue is adapted to receive said address portions and, is adapted to begin performing an address translation operation on a received address portion irrespective of a completion of a corresponding full-line portion.

5. A queue/pointer arrangement as claimed in claim 1, wherein said first pointer arrangement and said second pointer arrangement are used to indicate ready ones of execution information portions queued within said first queue and said second queue, respectively.

6. A queue/pointer arrangement to queue first execution information portions and second execution information portions for transactions, said arrangement comprising:
    a first queue means and second queue means for storing said first execution information portions and said second execution information portions, respectively, said first queue means and said second queue means having a first pointer means and a second pointer means, respectively, for pointing out ready ones of said first execution information portions and said second execution information portions in said first queue means and said second queue means, wherein said first queue means and said second queue means operate independently of one another,
    wherein said first execution information portions and corresponding said second execution information portions with respect to said first queue means and said second queue means, comprise respectively, address portions and full-line portions for said transactions.

7. A queue/pointer arrangement as claimed in claim 6, further comprising:
    a sending interlace adapted to transmit said first execution information portions and corresponding said second execution information portions to said first queue means and said second queue means, respectively, in at least one of differing times and differing transmissions.

8. A queue/pointer arrangement as claimed in claim 7, wherein said sending interface is adapted to transmit said first execution information portions when information thereof is complete, and to transmit corresponding said second execution information portions when information thereof is complete, with each first execution information portion and a corresponding second execution information portion capable of being completed at mutually differing times.

9. A queue/pointer arrangement as claimed in claim 6, wherein said first queue means is for receiving said address portions and, is for immediately beginning an address translation operation on a received address portion irrespective of a completion of a corresponding full-line portion.

10. A queue/pointer arrangement as claimed in claim 6, wherein said first pointer means and said second pointer means are for indicating ready ones of execution information portions queued within said first queue means and said second queue means, respectively.

11. A system comprising:
a queue/pointer arrangement to queue first execution information portions and second execution information portions for transactions, said arrangement comprising:
   a first queue and second queue adapted to store said first execution information portions and said second execution information portions, respectively, said first queue and said second queue having a first pointer arrangement and a second pointer arrangement, respectively, wherein said first queue and said second queue operate independently of one another,
   wherein said first execution information portions and corresponding said second execution information portions with respect to said first queue and said second queue, respectively comprise, address portions and full-line portions for said transactions.

12. A system as claimed in claim 11, further comprising:
a sending interface adapted to transmit said first execution information portions and corresponding said second execution information portions to said first queue and said second queue, respectively, in at least one of differing times and differing transmissions.

13. A system as claimed in claim 12, wherein said sending interface is adapted to transmit said first execution information portions when information thereof is complete, and to transmit corresponding said second execution information portions when information thereof is complete, with each first execution information portion and a corresponding second execution information portion capable of being completed at mutually differing times.

14. A system as claimed in claim 11, wherein said first queue is adapted to receive said address portions and, is adapted to begin performing an address translation operation on a received address portion irrespective of a completion of a corresponding full-line portion.

15. A system as claimed in claim 11, wherein said first pointer arrangement and said second pointer arrangement are used to indicate ready ones of execution information portions queued within said first queue and said second queue, respectively.

* * * * *

UNITED STATES PATENT AND TRADEMARK OFFICE
CERTIFICATE OF CORRECTION

PATENT NO. : 6,601,117 B1
DATED : July 29, 2003
INVENTOR(S) : Dahlen et al.

It is certified that error appears in the above-identified patent and that said Letters Patent is hereby corrected as shown below:

<u>Column 12,</u>
Lines 15 and 61, after the word "and", delete ",".
Line 44, delete "interlace" and insert -- interface --.

<u>Column 14,</u>
Line 12, after the word "and", delete ",".

Signed and Sealed this

Thirteenth Day of January, 2004

JON W. DUDAS
*Acting Director of the United States Patent and Trademark Office*